(12) United States Patent
Fekety et al.

(10) Patent No.: US 8,959,773 B2
(45) Date of Patent: Feb. 24, 2015

(54) METHOD OF MAKING MEMBRANE FILTER

(75) Inventors: Curtis Robert Fekety, Corning, NY (US); Yunfeng Gu, Painted Post, NY (US); Irene Mona Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 162 days.

(21) Appl. No.: 13/393,312

(22) PCT Filed: Sep. 23, 2010

(86) PCT No.: PCT/US2010/049910
§ 371 (c)(1),
(2), (4) Date: Feb. 29, 2012

(87) PCT Pub. No.: WO2011/038059
PCT Pub. Date: Mar. 31, 2011

(65) Prior Publication Data
US 2012/0159938 A1    Jun. 28, 2012

Related U.S. Application Data

(60) Provisional application No. 61/246,350, filed on Sep. 28, 2009.

(51) Int. Cl.
*B01D 63/06* (2006.01)
*C04B 38/00* (2006.01)
*F01N 3/022* (2006.01)
(Continued)

(52) U.S. Cl.
CPC .......... *F01N 3/0222* (2013.01); *B01D 63/066* (2013.01); *C04B 38/0009* (2013.01); *F01N 3/28* (2013.01); *F01N 3/2828* (2013.01); *B01D 63/061* (2013.01); *C04B 2111/00793* (2013.01); *C04B 2111/00801* (2013.01); *Y02T 10/20* (2013.01)
USPC ........... 29/896.62; 29/890; 29/458; 29/527.2; 502/74

(58) Field of Classification Search
USPC ............... 29/890, 896.62, 458, 527.2; 502/74
See application file for complete search history.

(56) References Cited

U.S. PATENT DOCUMENTS

| 4,253,992 | A |   | 3/1981 | Soejima et al. ............ 252/477 R |
|---|---|---|---|---|
| 4,412,921 | A |   | 11/1983 | Leung et al. ................ 210/500.2 |
| 4,557,773 | A | * | 12/1985 | Bonzo .............................. 156/64 |

(Continued)

FOREIGN PATENT DOCUMENTS

| EP | 320033 A1 | 6/1989 | ............. B01D 13/04 |
|---|---|---|---|
| EP | 524678 A1 | 1/1993 | ............. B01D 67/00 |

(Continued)

*Primary Examiner* — Alexander P Taousakis
*Assistant Examiner* — Matthew P Travers
(74) *Attorney, Agent, or Firm* — Charles A. Greene

(57) ABSTRACT

Wall flow membrane filters, fabricated by masking a first subset of the channels at one or both ends of a honeycomb body comprising an array of open-ended through-channels separated by porous channel walls, applying a membrane-forming composition to the porous channel walls of a second subset of the channels, curing the membrane-forming composition to provide a wall-adhering fluid-permeable membrane; and then plugging the first subset of channels at a first end of the body and the second subset of channels at a second end of the body, are useful in exhaust systems of improved particulate filtration efficiency for gasoline direct injection or diesel engines.

10 Claims, 2 Drawing Sheets

(51) Int. Cl.
*F01N 3/28* (2006.01)
*C04B 111/00* (2006.01)

(56) References Cited

U.S. PATENT DOCUMENTS

| | | | | |
|---|---|---|---|---|
| 4,849,275 | A | | 7/1989 | Hamaguchi et al. .......... 428/116 |
| 5,863,508 | A | * | 1/1999 | Lachman et al. ............. 422/171 |
| 6,149,973 | A | * | 11/2000 | Foerster et al. ............... 427/235 |
| 7,399,728 | B2 | * | 7/2008 | LaBarge ...................... 502/325 |
| 2002/0175451 | A1 | | 11/2002 | Vance et al. .................. 264/631 |
| 2003/0180195 | A1 | * | 9/2003 | Chapman et al. ............. 422/168 |
| 2006/0213164 | A1 | | 9/2006 | Hatano et al. ..................... 55/52 |
| 2008/0241009 | A1 | | 10/2008 | Ohno et al. .................... 422/180 |
| 2009/0155525 | A1 | | 6/2009 | Li ................................. 428/116 |

FOREIGN PATENT DOCUMENTS

| | | | |
|---|---|---|---|
| EP | 1302231 A1 | 4/2003 | ............. B01D 39/20 |
| WO | 02/085814 | 10/2002 | ............. C04B 38/00 |

* cited by examiner

METHOD OF MAKING MEMBRANE FILTER

CROSS REFERENCE TO RELATED APPLICATION

This application claims the benefit of priority to U.S. Provisional Application No. 61/246,350, filed on Sep. 28, 2009.

BACKGROUND

1. Field

The present disclosure relates generally to fluid filtration and more particularly to methods for manufacturing membrane filters for the removal of fine particulates from fluid streams.

2. Technical Background

Ceramic wall flow filters are presently employed for the removal of particulates from fluid exhaust streams such as power plant stack gases and combustion engine exhausts. Examples include the ceramic soot filters used to remove unburned carbonaceous particulates from diesel engine exhaust gases. Present diesel particulate filters, or DPFs, consist of honeycomb structures formed by arrays of parallel channels bounded and separated by porous channel walls or webs, with a portion of the channels being blocked or plugged at the filter inlet and the remaining channels being plugged at the filter outlet. Exhaust gas to be filtered enters the unplugged inlet channels and passes through the channel walls to exit the filter via the unplugged outlet channels, with the particulates being trapped on or within the inlet channel walls as the gas traverses the filter.

Standard gasoline engines do not require exhaust filtration, but gasoline direct injection (GDI) engines, which are more fuel-efficient than standard gasoline engines, do emit some soot particles of fine particle size. For this reason, and due to tightening environmental regulations governing exhaust emissions from motor vehicles, stricter limits on particulate emissions from gasoline engines are to be expected.

Current diesel particulate filters have porosities that efficiently trap the relatively large soot particulates produced by diesel engines. However, they are less efficient than would be desirable for the collection of particulates of very fine particle size, and in addition impose fuel consumption penalties due to the higher exhaust backpressures generated by the filters. Gasoline engines will likely require filters of higher trapping efficiency than offered by conventional diesel particulate filters.

There is a well-known trade-off between filtration efficiency and backpressure. From the viewpoint of high filtration efficiency, a particle filter of small pore size and large filtration wall thickness is preferred, while from the viewpoint of low backpressure, large pore size and small wall or web thickness are more desirable. One filter design that has been proposed to increase filtration efficiency without a large pressure drop penalty is the so-called membrane filter, wherein a relatively thin membrane of small pore size is applied to a supporting filter wall of higher thickness but larger pore size.

For honeycomb membrane filters intended for high temperature use, the membranes are typically formed of thin porous layers of a refractory ceramic or glass material, with or without a catalytically active metal component, and are generally applied via slurry coating to either the inlet channels or outlet channels of the structure. The simultaneous coating of all channel walls would be less expensive from a processing standpoint, but more expensive from the standpoint of materials costs, and both unnecessary and disadvantageous from the standpoints of filtration efficiency and filter pressure drop.

Present processes being considered for membrane filter fabrication generally comprise feeding or drawing a membrane coating slurry into the inlet or outlet channels of a pre-plugged honeycomb body, drying the resulting coating, and firing the coated honeycomb to a temperature sufficiently high to consolidate and bond coating constituents into an adherent membrane layer. Problems with these processes are several, including high processing costs and uneven membrane thickness. A further problem is that the heating required to consolidate and bond the membrane coating to the channel walls can damage plug integrity and/or loosen the bonds formed between the plugs and the honeycombs, creating filter durability and/or leakage problems.

SUMMARY

The methods of the present disclosure enable the fabrication of wall flow membrane filters incorporating thin permeable membranes of controlled and uniform thickness as well as channel plugs of good adherence and plug integrity. Further, the disclosed methods enable the utilization of highly refractory membrane materials that can provide chemically stable and mechanically durable membranes, thereby rendering the filters eminently suitable for use under adverse thermal, chemical and/or mechanical conditions such as commonly found in combustion engine exhaust systems.

Among embodiments of the methods disclosed herein for making wall flow membrane filters are those involving the processing of unplugged porous honeycomb bodies. A honeycomb body comprising an array of open-ended through-channels separated by porous channel walls is first selected for processing. The selected body may be formed of any one of a number of porous ceramic materials having refractoriness and durability sufficient for use in high temperature combustion exhaust environments.

The selected honeycomb body is prepared for coating by masking a first subset of the channels of the honeycomb at one or both ends of the body. The masking procedure and material used will be such as are effective to temporarily block fluid ingress into the first subset of channels from at least one end of the body. Thereafter a membrane-forming composition is applied to the porous channel walls of a second subset of channels, i.e., a subset comprising some or all of the honeycomb channels that have not been masked against fluid penetration.

Following the application of a continuous coating of the membrane-forming composition to the walls of the second subset of channels, the membrane-forming composition is cured to provide a fluid-permeable, wall-adhering membrane on those walls. In general, curing will involve heating the coating to remove fugitive liquid coating components and to bind the solid coating components into a continuous but porous membrane. For use in high temperature environments, the solid components of the membrane-forming composition will be refractory materials or precursors for refractory materials, and heating will be to temperatures well in excess of expected filter use temperatures and at least sufficient to consolidate the solid components into a continuous membrane.

Once the membrane-forming composition has been applied and cured, plugging to convert the flow-through honeycomb to a wall flow honeycomb filter configuration is carried out. A suitable procedure involves plugging the first subset of channels at a first end of the body and plugging the second subset of channels at a second end of the body. Conventional plugging materials, processes and equipment may be used to carry out this procedure.

Wall flow membrane filters resulting from the processing of honeycomb structures in accordance with the above-disclosed methods show improved filtration efficiencies with no or minimal increases cross-filter pressure drops. Thus they are sufficiently durable for use in the treatment of combustion exhaust streams from mobile and stationary pollution sources.

The present disclosure therefore further encompasses exhaust systems for internal combustion engines that incorporate efficient wall-flow membrane filters made in accordance with the above-described methods. In particular, exhaust systems incorporating such filters wherein the combustion engine is a gasoline direct injection engine, or where the combustion engine is a diesel engine, are provided.

BRIEF DESCRIPTION OF THE DRAWINGS

The methods and systems of the present disclosure are further described below with reference to the appended drawings, wherein.

DETAILED DESCRIPTION

Figure 1:
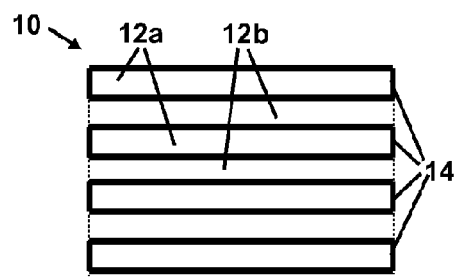
FIG. 1 is a schematic cross-sectional view of a portion of a ceramic honeycomb body provided with perforated masks disposed on opposing ends of a subset of honeycomb channels.

The compositions of the honeycombs selected for processing in accordance with the above-disclosed methods are not critical, since any of a number of porous ceramics known for use in the construction of honeycomb catalyst supports or filters, or having properties suitable for such use, may be employed. Thus while many of the illustrative examples of filters hereinafter disclosed utilize honeycomb starting structures formed of cordierite ceramics, cordierite being a material widely used for commercial exhaust filter fabrication, other ceramics such as aluminum titanate, silicon carbide, silicon nitride, silicon carbonitride, alumina, mullite, spodumene or the like may alternatively be employed.

A number of materials and techniques are known for selectively masking the channels honeycomb ceramic bodies, most frequently for the purpose of plugging the bodies to form wall flow filter products therefrom. For the purpose of applying porous membrane layers by the methods of the present disclosure, a useful procedure is to adhere a sheet of fluid-impermeable material to at least one end of the bodies, and then to selectively perforate the sheet to open the second subset of honeycomb channels for coating. Perforating the sheet in a checkerboard pattern so that each masked channel is surrounded by unmasked channels, and each unmasked channel is surrounded by masked channels, is an appropriate procedure for optimizing gas flow and minimizing cross-filter pressure drop in an exhaust system incorporating the filter.

Depending upon the method selected for introducing a membrane-forming composition into the subset of channels selected for membrane coating, only one face of the honeycomb body may have to be masked. However, embodiments of the disclosed methods involving masking the first subset of channels at both ends of the body are advantageous in that accidental backflows of the membrane-forming composition into the open ends of the first subset of channels may be avoided.

While vapor deposition or other methods may in principle be used to apply a membrane-forming composition to the porous channel walls of the second subset of honeycomb channels, embodiments of the disclosed methods comprising deposition via the application of a coating of a flowable suspension of a sinterable inorganic particulate in an evaporable carrier liquid are both economic and effective. A number of sinterable particulates have been employed for the production of fluid-permeable coatings on suitable support surfaces, including, for example, particulates such as glass powders and powders of oxide, carbide, or nitride ceramics, ceramic precursors, or mixtures of such ceramics or precursors. A metal component, for example a catalytically active metal such as Pt, Pd, Rh, Ru or the like, may be included where a catalytically active membrane is desired.

The particular illustrations of the above-disclosed methods set forth below include examples wherein the membrane-forming composition comprises a fluid suspension of an oxide-based particulate composed of one or more compounds selected from the group consisting of cordierite and alumina. It will nevertheless be apparent from those descriptions that the same methods may readily be adapted to provide membranes of other compounds, including, for example, catalyzed membranes made from a fluid suspension of a zeolite powder incorporating a Group VIII metal catalyst.

Among the specific advantages of the practice of the methods disclosed herein are the uniformity and controlled thickness of the resulting porous membranes. Current methods for coating the walls of porous honeycombs, such as those presently used for depositing catalysts and/or catalyst-supporting washcoats thereon, often involve uneven coating contact times and/or application pressures that substantially increase the difficulty of forming coatings of controlled and even thickness. As hereinafter more fully disclosed, some embodiments of the present methods include a step of applying the membrane-forming composition that comprises gravitationally flowing the composition vertically through the second subset of channels with the assistance of a vertical pressure gradient. The uniform contact times and pressures secured through the use of such methods greatly facilitate the production of continuous membranes of controlled and uniform thickness.

An important variable that can affect the quality and continuity of the deposited membranes is the surface character of the porous channel walls of the honeycombs. Uneven porosity and/or uneven microcracking of the surfaces of those walls can result in uneven membrane thicknesses or uneven levels of membrane porosity. Embodiments of the disclosed methods that can effectively address such problems comprise a preliminary supplemental step of applying a pore-filling material to the porous channel walls of the second subset of channels prior to applying the membrane-forming composition thereto. Examples of suitable pore-filling materials include solutions or suspensions of fugitive organic materials including polymers, monomers, starches and proteins that can readily be removed from channel wall surfaces following the application of the membrane-forming composition.

The curing of the membrane-forming composition typically comprises heating the body with an applied coating of inorganic particulates to a first or curing temperature, that temperature being sufficient to at least partially sinter and bond the particulates into a wall-adhering fluid-permeable membrane. The unmasking or removal of the perforated masking material can be completed before, during, or after the curing of the membrane-forming composition has been completed.

The plugging of the honeycomb body to arrive at the desired wall flow configuration is carried out after the membrane-forming composition has been cured by heating. In accordance with particular embodiments of the disclosed methods the process of plugging the first and second subsets of channels comprises the steps of (i) inserting a plugging material into the ends of the channels, and (ii) curing the plugging material by heating the plugging material to a second or plug curing temperature for the selected plugging material. Generally, the second or plug-curing temperature will be lower than the first or curing temperature, and in some cases is necessarily lower. Thus it is a particular advantage of those embodiments of the present methods that the use of membrane-forming compositions requiring much higher curing temperatures than can be safely tolerated by conventional filter plugging materials is easily facilitated.

The present methods are further described below with reference to illustrative procedures that are generally applicable to membrane filter production utilizing a variety of different honeycomb and membrane compositions and application steps. For example, one useful practice for preparing honeycomb bodies for membrane application comprises flushing the channeled structures with deionized water, clearing the channels of water and debris with compressed air, and drying the bodies in hot air for several hours. Sheets of a masking material of silicone composition may then be adhered to one or both ends of the honeycombs and perforated with a laser beam to open subsets of channels for coating.

Figure 2:
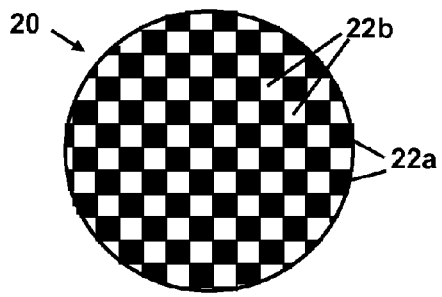
FIG. 2 is an end view of a honeycomb body supporting a mask perforated in a checkerboard pattern.

FIGS. 1 and 2 of the drawing provide schematic views of honeycomb bodies supporting perforated sheets of a masking material such as a silicone material on ends of the honeycombs. FIG. 1 shows a portion of a honeycomb body 10 comprising a parallel channel array including masked channels 12a and unmasked channels 12b. The masked channels are blocked at both ends by segments 14 of a masking material such as a perforated silicone sheet. FIG. 2 of the drawings is an end view of a honeycomb structure 20 comprising unmasked channels 22b and masked channels blocked with mask segments 22a, the masked and unmasked channels forming a checkerboard pattern suitable for membrane wall-flow filter manufacture.

The coating of the walls of the unmasked channels in designs such as shown in FIGS. 1 and 2 can be carried out with membrane-forming compositions comprising water-based ceramic slips comprising deionized water, ceramic particles of, for example, cordierite or alumina, and conventional dispersants, binders, and anti-foaming agents. The slips may be ball-milled for several hours to assure homogeneity. Pore-forming additives may be included in the slips if it is desired to increase the porosity of the cured membranes. Evaporable, non-aqueous liquid carriers may be used in addition to or in place of water if desired.

Suitable pre-treatments of porous honeycomb bodies composed of cordierite ceramic materials to form pore-filling coatings on the channel walls can be useful where the walls comprise pores in excess, for example, of 5 μm in diameter. Organic materials useful for providing such coatings may comprise, for example, synthetic polymers, starches, or even protein emulsions of low concentration such as non-fat milk. Dip coating followed by moderate temperature (e.g., room temperature to 100° C.) drying comprises a suitable procedure for applying such coatings.

The curing of applied membrane-forming compositions comprising cordierite or alumina slips can comprise drying for several hours at temperatures above 100° C., and then firing the dried slip-coatings and honeycomb bodies at temperatures in the range of 1150-1380° C. Where masking layers of silicone are used during coating application, they should be removed before firing.

As noted above, the thickness and uniformity of applied slip coatings of ceramic particulates can be improved if the coatings are applied using a combination of gravity flow and pressure-assisted flow. Apparatus suitable for practicing this method comprises a vertical assembly including an upper reservoir for containing a charge of a coating slip, a coating chamber positioned below the reservoir but in fluid communication with an outlet valve on the reservoir, and a slip collection chamber positioned below the coating chamber and connected to a coating chamber outlet for collecting coating slip passing from the reservoir and through the coating chamber. Provision is made for drawing a vacuum within the apparatus below the upper reservoir to draw coating slip from the reservoir through the coating chamber.

Figure 3:
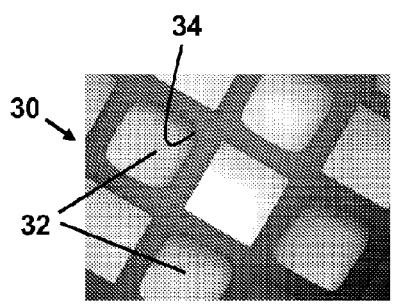
FIG. 3 is an end view of a portion of a honeycomb body supporting membrane layers on alternating channels.

In the operation of such apparatus, the upper reservoir is filled with coating slip and a masked honeycomb body is placed within the coating chamber below the reservoir, the honeycomb being oriented vertically to allow rapid fluid flow through unmasked honeycomb channels. A vacuum is then drawn below the honeycomb and the coating slip is released into the coating chamber to pass vertically through the unmasked honeycomb channels, the flow of the slip being under the influence of gravity as well as the pressure differential created by the vacuum. The uniformity of a cured membrane produced by coating according to this procedure is illustrated in FIG. 3 of the drawing, which is an end view of a section of a membrane-coated honeycomb 30 wherein the membrane-coated channels 32 exhibit filleted or rounded corners.

The methods of the present disclosure are further described below with reference to a number of specific examples that are intended to be illustrative rather than limiting.

Example 1

Honeycomb Masking

Cordierite honeycomb samples of 2-inch diameter and 6-inch length, having a cell density of 400 channels per inch of honeycomb cross-section and channel walls of 0.006-inch thickness exhibiting minimal micro cracking are selected for treatment. The channel walls have an average pore diameter of about 10 μm and a porosity of 61%.

The honeycombs are flushed with deionized water and dried at 120° C. overnight. Adherent silicone masking films are then applied to one end of one group of honeycomb samples and both ends of another group of honeycomb samples. The films are then perforated with a laser beam to form a checkerboard pattern of open-ended cells and cells blocked at one or both ends with the silicone film.

Example 2

Alumina Membrane Application

Two cordierite honeycomb samples having alternate channels masked with silicone films at one end as in Example 1 above and one cordierite sample with alternate channels masked at both ends as in Example 1 above are selected for coating. Each sample is first pretreated by coating the walls of the open-ended channels with a pore-filling coating material. For that purpose a 900 ml charge of a protein emulsion (fat-free milk) is passed vertically through the open channels of each of the honeycombs under the combined action of gravity and a vacuum-generated pressure differential. The thus-coated honeycombs are next centrifuged at 325 rpm for 1 minute and dried at 20° C. for 10 hr and then 60° C. for 10 hr.

Two alumina slips are prepared for the purpose of forming membrane coatings on the walls of the open honeycomb channels. Both slips comprise 40% by weight of Sumitomo™ AA-3 alumina in a deionized water base, with one slip containing 4% by weight and the other 8% by weight of a polyethylene glycol binder of molecular weight 20,000. Each 500 g sample of slip additionally comprises 0.40 g of Tiron™ 4,5-dihydrony-1,3-benzenedissulfonic acid disodium salt surfactant and 4.6 g of Dow Corning DC-B antifoam emulsion, with the alumina, water and surfactant first being ultrasonically blended together and the binder and anti-foaming agent thereafter added for final milling. The resulting slip mixtures are finally ball-milled for 15 hr, filtered, and de-gassed.

The alumina slips thus prepared are next applied as coatings to the walls of the open-ended channels of the honeycomb samples. The combined gravitational/pressure flow coating method used to apply the pore-filling coating is used to apply the alumina coatings. After coating, excess alumina slip is removed from the channels by centrifuging the samples at 325 rpm for 1 minute. The coated samples are then dried at 120° C. for 5 hr and fired at 1300° C. for 2 h to cure the resulting alumina membranes. The cured membranes have thicknesses in the range of 10-20 μm, median pore sizes of about 1.1 μm, and porosities of about 47.3%.

Example 3

Cordierite Membrane Application

Cordierite slips are used to apply cordierite membranes to cordierite honeycomb samples prepared and masked as described in Example 1 above. The same pore-filling pre-coating, slip preparation, slip application, and drying procedures employed for alumina membrane application in Example 2 above are employed for cordierite membrane application in accordance with this Example.

Table 1 below reports the compositions of the four slips. The binders, surfactants and antifoaming agents used in those compositions are the same as those used in formulating the alumina slips. The cordierite powder used for slip preparation has a median particle size of 4 μm.

TABLE 1

Cordierite slips

|  | Slip 1 | Slip 2 | Slip 3 | Slip 4 |
|---|---|---|---|---|
| Cordierite powder | 200.00 g | 175.00 | 175.00 | 115.00 |
| Surfactant | 0.40 g | 0.35 | 0.35 | 0.23 |
| D.I. Wwater | 191.15 g | 334.15 | 368.88 | 376.43 |
| Binder | 130.40 g | 85.07 | 41.67 | 95.83 |
| Antifoam Agent | 4.45 g | 6.12 | 6.12 | 6.90 |
| Total weight | 526.40 | 600.69 | 592.02 | 594.39 |

To form continuous cordierite membranes on the surfaces of the unmasked channels of the cordierite honeycombs, the applied and dried slip coatings are fired at 1300° C. for 2 hr. at a heating rate of 1° C./min. Table 2 below reports honeycomb sample weight gains for selected samples resulting from the application of alumina and honeycomb membranes to the walls of alternating honeycomb channels in accordance with Examples 2 and 3 above.

TABLE 2

Membrane Honeycomb Samples

| Sample ID | Mask Application | Membrane Composition | Slip Solids (% wt) | Binder Conc. (% wt.) | Honeycomb Weight Gain (%) |
|---|---|---|---|---|---|
| A | one end | cordierite | 40% | 4% | 42.72% |
| B | one end |  | 35% | 4% | 29.18% |
| C | one end |  | 30% | 2% | 13.64% |
| D | one end |  | 20% | 4% | 6.11% |
| G | one end | alumina | 40% | 4% | 21.72% |
| E | two end |  | 40% | 4% | 23.67% |
| F | one end |  | 40% | 8% | 17.33% |

Figure 4:
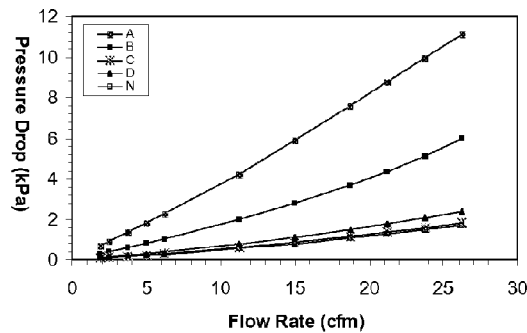
FIG. 4 is a graph plotting pressure drops against gas flow rates for a first group of honeycomb filters.

FIG. 4 of the drawings compares the pressure drop performance of the four cordierite membrane filters incorporating cordierite membranes as reported in Table 2 above with the performance of an uncoated (non-membrane) filter labeled "N" in the drawing. The comparisons are presented as plots of pressure drops as a function of gas flow rates through the filters.

The Sample IDs reported in Table 2 are shown in the drawing key. The filters tested are fabricated from the membrane honeycombs of Table 2 by providing checkerboard patterns of end plugs at opposing ends of each of the honeycombs, with the uncoated or outlet filter channels being plugged at the inlet ends of the filters and the membrane-coated or inlet filter channels being plugged at the outlet ends of the filters.

The pressure drops across the plugged filters are observed to increase with increasing gas flow rate through the structures, with the pressure drops for the membrane filters being higher than those of the uncoated filter. In addition, the pressure drops for the membrane filters are generally observed to increase with the honeycomb weight pickup resulting from membrane application. Table 3 below lists weight pickups and pressure drops for each of the samples at a gas flow rate of 26.25 cubic feet per minute through the filter structures. The pressure drop for the membrane filter with a weight pick-up of 6.11% increased by only 7.23% over the pressure drop for the uncoated filter.

TABLE 3

Cordierite Membrane Filter Pressure Drops.

|  | Sample ID | Membrane Weight Gain | Pressure Drop (26.25 CFM) |
|---|---|---|---|
| Cordierite | A | 42.72% | 562.17% |
| Membrane | B | 29.18% | 256.63% |
| Filters | C | 13.64% | 39.86% |
|  | D | 6.11% | 7.23% |

Figure 5:
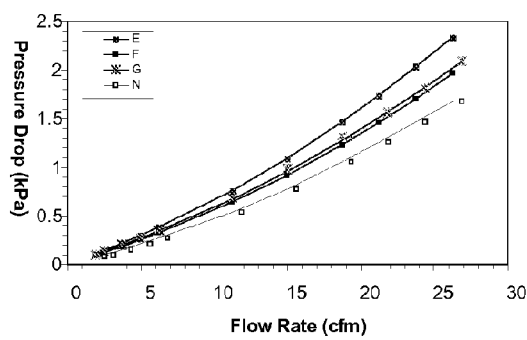
FIG. 5 is a graph plotting pressure drops against gas flow rates for a second group of honeycomb filters.

FIG. 5 of the drawings compares the pressure drop performance of the three cordierite honeycomb filters incorporating alumina membranes as reported in Table 2 above with the performance of an uncoated (non-membrane) filter labeled "N" in the drawing. Again the comparisons are presented as plots of pressure drops as a function of gas flow rates through the filters.

The Sample IDs reported in Table 2 are shown in the drawing key for FIG. 5. Again the filters tested are fabricated from the alumina membrane honeycombs of Table 2 by providing checkerboard patterns of end plugs at opposing ends of each of the honeycombs, with the uncoated or outlet filter channels being plugged at the inlet ends of the filters and the membrane-coated or inlet filter channels being plugged at the outlet ends of the filters.

Table 4 below compares the pressure drops across the three alumina membrane filters of different membrane weight pick-up. The same trends are found for the alumina membrane filters as for the cordierite membrane filters. The membrane filters with lower weight pickups generally show somewhat lower pressure drops. The pressure drop of the membrane filter with a weight pick-up of 17.33% increased by less than 17% compared to the non-membrane filter.

TABLE 4

Alumina Membrane Filter Pressure Drops

| Sample ID | Membrane Weight Gain | Pressure Drop (26.25 CFM) |
|---|---|---|
| Alumina Membrane Filter | G | 21.72% | 24.22% |
| | E | 23.67% | 39.12% |
| | F | 17.33% | 16.87% |

Figure 6:
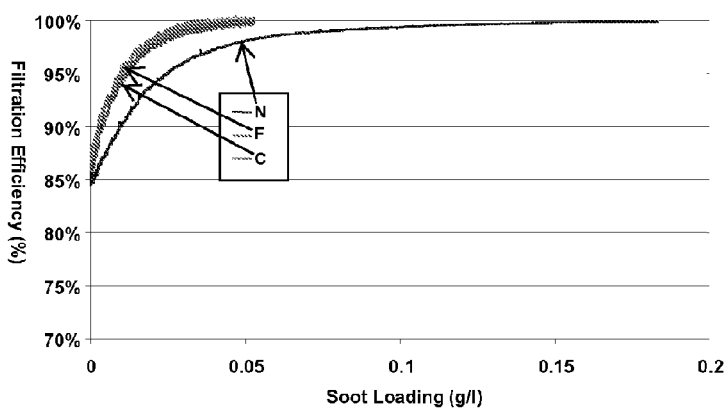
FIG. 6 is a graph plotting filtration efficiency against soot loading for a third group of honeycomb filters.

FIG. 6 of the drawings compares the particulate removal or filtration efficiency of a non-membrane filter (labeled "N") with a first cordierite filter provided with a cordierite membrane ("C") and a second cordierite filter provided with an alumina membrane ("F"). The comparisons are presented as plots of filtration efficiencies versus the soot particle loadings on the filters, with increasing soot loadings generally providing higher filtration efficiencies. The clear advantages of the two membrane filters over the non-membrane filter in terms of the higher filtration efficiencies reached by the membrane filters at equivalent loadings of trapped particulates are evident.

Figure 7:
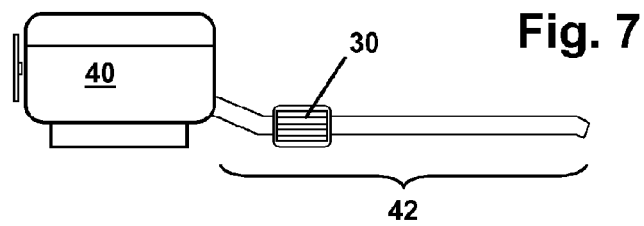
FIG. 7 is a schematic diagram of a combustion engine with an exhaust system incorporating a honeycomb filter.

Membrane filters such as illustrated in the above examples can be utilized in exhaust systems for combustion engines in the same manner as conventional ceramic wall flow exhaust filters not provided with membranes for improved particulate removal. FIG. 7 of the drawings is a schematic illustration of an internal combustion engine 40 comprising an exhaust system 42 comprising a wall flow membrane filter 30 made in accordance with the foregoing description. Engine 40 may comprise, for example, a gasoline direct injection engine, a diesel engine, or any other combustion engine or exhaust source producing exhaust gases containing fine particulates to be treated for particulate removal.

Of course the foregoing descriptions and examples of particular embodiments of the methods and systems of the present disclosure are merely illustrative, it being evident from those descriptions that a broad range of alternative materials, procedures and apparatus may be adopted for the practice of the disclosed methods within the scope of the appended claims.

What is claimed is:

1. A method of making a wall flow membrane filter, the method comprising:

selecting a honeycomb body comprising an array of open-ended through-channels separated by porous channel walls that have first pores of a first pore size;

masking a first subset of the channels at one or both ends of the body to form a masked body;

applying a membrane-forming composition to the porous channel walls of a second subset of channels of the masked body;

curing the membrane-forming composition at a membrane-curing temperature to provide a wall-adhering fluid-permeable membrane that has second pores of a second pore size smaller than the first pore size;

after said curing of the membrane-forming composition, inserting a plugging material into the first subset of channels at a first end of the body, wherein the plugging material is different than the membrane-forming composition;

inserting a plugging material into the second subset of channels comprising the wall-adhering fluid-permeable membrane at a second end of the body; and curing the plugging material at the first and second ends of the body by heating the plugging material to a plug-curing temperature that is less than the membrane-curing temperature.

2. The method of claim 1, further comprising the further step of unmasking the body before, during, or after curing the membrane-forming composition.

3. The method of claim 1, comprising masking the first subset of channels at both ends of the body.

4. The method of claim 1, wherein masking comprises the steps of adhering a sheet of material to at least one end of the body and perforating the sheet in a checkerboard pattern to open the second subset of channels.

5. The method of claim 1, wherein the step of applying the membrane-forming composition comprises coating the porous channel walls with a flowable suspension of a sinterable inorganic particulate.

6. The method of claim 5, wherein the step of curing the membrane-forming composition comprises heating the body and inorganic particulate to the curing temperature to at least partially sinter and bond the particulate into the wall-adhering fluid-permeable membrane.

7. The method of claim 1, wherein the step of applying the membrane-forming composition comprises gravitationally flowing the composition vertically through the second subset of channels with the assistance of a vertical pressure gradient.

8. The method of claim 1, comprising the further step of applying a pore-filling material to the porous channel walls of the second subset of channels prior to applying the membrane-forming composition thereto.

9. The method of claim 1, wherein the honeycomb body is formed of a cordierite ceramic and the membrane-forming composition comprises a fluid suspension of an oxide-based particulate composed of one or more compounds selected from the group consisting of cordierite and alumina.

10. The method of claim 1, wherein the honeycomb body is formed of a cordierite ceramic and the membrane-forming composition comprises a fluid suspension of a zeolite powder incorporating a Group VIII metal catalyst.

* * * * *